United States Patent
Hsu et al.

(10) Patent No.: US 11,294,586 B2
(45) Date of Patent: Apr. 5, 2022

(54) METHOD FOR PERFORMING READ ACCELERATION, ASSOCIATED DATA STORAGE DEVICE AND CONTROLLER THEREOF

(71) Applicant: Silicon Motion Inc., Hsinchu County (TW)

(72) Inventors: Che-Wei Hsu, Taichung (TW); Hsin-Hsiang Tseng, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 16/251,034

(22) Filed: Jan. 17, 2019

(65) Prior Publication Data

US 2020/0117378 A1  Apr. 16, 2020

(30) Foreign Application Priority Data

Oct. 15, 2018  (TW) ................................. 107136132

(51) Int. Cl.
*G06F 3/06*       (2006.01)
(52) U.S. Cl.
CPC .......... *G06F 3/0638* (2013.01); *G06F 3/0604* (2013.01); *G06F 3/0619* (2013.01); *G06F 3/0688* (2013.01)
(58) Field of Classification Search
CPC .... G06F 3/0638; G06F 3/0604; G06F 3/0619; G06F 3/0688
See application file for complete search history.

(56) References Cited

U.S. PATENT DOCUMENTS

| | | | |
|---|---|---|---|
| 9,910,786 B2 | 3/2018 | Freyensee | |
| 2007/0239926 A1* | 10/2007 | Gyl | G11C 7/1075 711/103 |
| 2011/0026318 A1* | 2/2011 | Franceschini | G06F 13/161 365/163 |
| 2013/0215020 A1* | 8/2013 | Matsuda | G06F 3/03 345/157 |
| 2014/0122797 A1* | 5/2014 | Yadav | G06F 3/061 711/114 |
| 2016/0299724 A1* | 10/2016 | Vanaraj | G06F 11/1076 |

(Continued)

FOREIGN PATENT DOCUMENTS

TW           201227293 A1    7/2012

*Primary Examiner* — Michelle T Bechtold
(74) *Attorney, Agent, or Firm* — Winston Hsu

(57) ABSTRACT

A method for performing read acceleration, an associated data storage device and controller thereof are provided, where the method is applicable to the data storage device and the controller. The method includes: receiving a write command from a host device, and performing programming on a non-volatile (NV) memory element within a plurality of NV memory elements according to the write command; recording operation command-related information corresponding to the write command; when a read command having high priority exists in a queue corresponding to the NV memory element, suspending performing programming on the NV memory element; executing the read command; and after executing the read command, continuing performing programming on the NV memory element at least according to the operation command-related information.

12 Claims, 3 Drawing Sheets

(56) References Cited

U.S. PATENT DOCUMENTS

2018/0284871 A1   10/2018  Surti
2019/0050312 A1*  2/2019  Li ...................... G06F 11/1044
2019/0227745 A1*  7/2019  Hong ................. G06F 13/1642

* cited by examiner

METHOD FOR PERFORMING READ ACCELERATION, ASSOCIATED DATA STORAGE DEVICE AND CONTROLLER THEREOF

BACKGROUND OF THE INVENTION

1. Field of the Invention

The present invention is related to access to a flash memory, and more particularly, to a method for performing read acceleration, an associated data storage device and a controller thereof.

2. Description of the Prior Art

Developments in memory technology have led to the wide application of portable or non-portable memory devices, such as a memory card conforming to the SD/MMC, CF, MS or XD specification, or an embedded memory device conforming to the UFS or EMMC specification. Improving access control of memories in these memory devices remains an issue to be solved in the art.

NAND flash memories may comprise single level cell (SLC) and multiple level cell (MLC) flash memories. In an SLC flash memory, each transistor used as a memory cell may have either of two electrical charge values, respectively representing the logic values 0 and 1. The storage ability of each transistor used as a memory cell in an MLC flash memory may be fully utilized, where the transistor may be driven by a voltage higher than in the SLC flash memory, and different voltage levels can be utilized to record information of at least two bits (e.g. 00, 01, 11, or 10). In theory, the recording density of the MLC flash memory may reach at least twice the recording density of the SLC flash memory, and is therefore preferred by manufacturers of NAND flash memories.

Compared with the SLC flash memory, the lower cost and larger capacity of the MLC flash memory means it is more likely to be applied in memory devices. The MLC flash memory does have instability issues, however. To ensure that access control of the flash memory in the memory device meets related specifications, a controller of the flash memory is usually configured to have management mechanisms to properly manage data access.

Related art memory devices with the above management mechanisms still have some disadvantages. For example, after issuing a check state command, a specific management mechanism might wait for a result, and after some commands are filled into a command queue, the specific management mechanism can only sequentially execute these commands, which may cause a condition where a data storage device is not able to deal with urgent commands. More particularly, under a condition where the storage device is performing programming on a flash memory element therein, when a user is going to obtain data, and the data is stored in this flash memory element, the user must wait until the programming is finished. Thus, a novel method and associated architecture are needed for improving performance of a data storage device without introducing side effects or in a way that is less likely to introduce side effects.

SUMMARY OF THE INVENTION

An objective of the present invention is to provide a method for performing read acceleration, an associated data storage device and a controller thereof, to solve the aforementioned problems.

Another objective of the present invention is to provide a method for performing read acceleration, an associated data storage device and a controller thereof, which can achieve optimal performance of a data storage device without introducing side effects or in a way that is less likely to introduce side effects.

At least one embodiment of the present invention provides a method for performing read acceleration, wherein the method is applicable to a data storage device (more particularly, a controller thereof). The data storage device comprises a non-volatile (NV) memory, and the NV memory comprises a plurality of NV memory elements. The method comprises: receiving a write command from a host device, and performing programming on an NV memory element within the plurality of NV memory elements according to the write command; recording operation command-related information corresponding to the write command; in response to a read command having high priority existing in a queue corresponding to the NV memory element, suspending performing programming on the NV memory element; executing the read command; and after executing the read command, continuing performing programming on the NV memory element at least according to the operation command-related information.

At least one embodiment of the present invention provides a data storage device, which may comprise: an NV memory, arranged to store information, wherein the NV memory comprises a plurality of NV memory elements; and a controller, coupled to the NV memory, arranged to control operations of the data storage device. The controller may comprise a processing circuit, and the processing circuit may control the controller according to a plurality of host commands from a host device, to allow the host device to access the NV memory through the controller. For example: the controller receives a write command from the host device, and performs programming on an NV memory element within the plurality of NV memory elements according to the write command, wherein the write command is a host command within the plurality of host commands; the controller records operation command-related information corresponding to the write command; when a read command having high priority exists in a queue corresponding to the NV memory element, the controller suspends performing programming on the NV memory element, wherein the read command is another host command within the plurality of host commands; the controller executes the read command; and after executing the read command, the controller continues performing programming on the NV memory element at least according to the operation command-related information.

At least one embodiment of the present invention provides a controller of a data storage device, wherein the data storage device comprises the controller and an NV memory, and the NV memory comprises a plurality of NV memory elements. The controller may comprise a processing circuit, and the processing circuit may control the controller according to a plurality of host commands from a host device, to allow the host device to access the NV memory through the controller. For example: the controller receives a write command from the host device, and performs programming on an NV memory element within the plurality of NV memory elements according to the write command, wherein the write command is a host command within the plurality of host commands; the controller records operation command-related information corresponding to the write command; when a read command having high priority exists in a queue corresponding to the NV memory element, the controller suspends performing programming on the NV memory element, wherein the read command is another host command within the plurality of host commands; the controller executes the read command; and after executing the read command, the controller continues performing programming on the NV memory element at least according to the operation command-related information.

The present invention can properly control operations of a controller through queue management and programming interruption management in order to prevent a storage device being slowed down due to programming. In addition, implementing the embodiments of the present invention will not greatly increase additional costs. Thus, problems of the related art can be solved without greatly increasing overall costs. Compared with the related art, the present invention can achieve optimal performance of the data storage device without introducing side effects or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
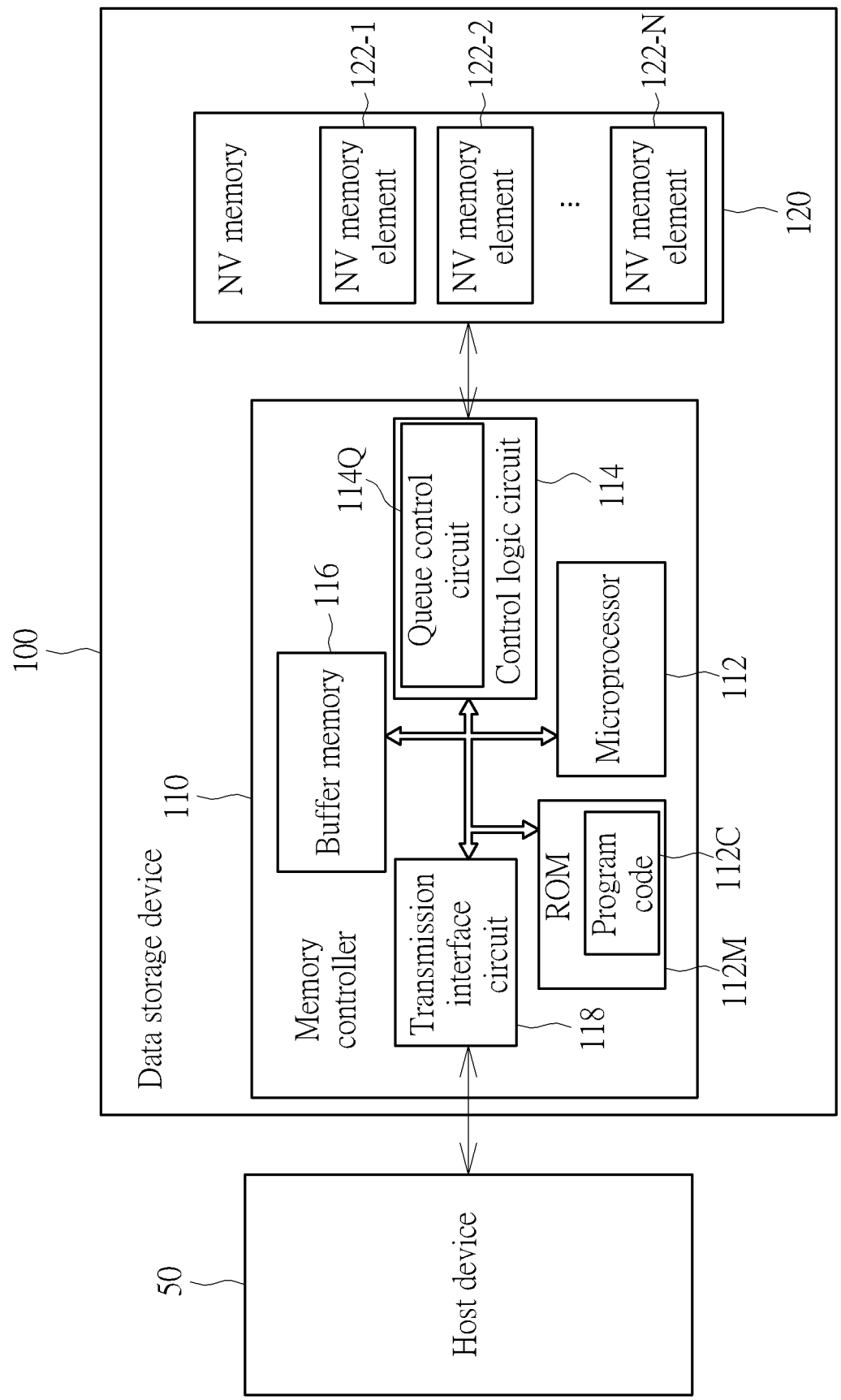
FIG. 1 is a diagram illustrating a data storage device and a host device according to an embodiment.

Refer to FIG. 1, which is a diagram illustrating a data storage device 100 and a host device 50 according to an embodiment of the present invention. For example, the data storage device 100 may be a portable data storage device (e.g. a memory card conforming to the SD/MMC, CF, MS or XD specification) or a solid state drive (SSD). In addition, examples of the host device 50 may include, but are not limited to: a multifunctional mobile phone, a tablet, a wearable device and a personal computer such as a desktop computer or a laptop computer. According to this embodiment, the data storage device 100 comprises a controller such as a memory controller 110, and may further comprise a non-volatile (NV) memory 120, where the controller is arranged to access the NV memory 120, and the NV memory 120 is arranged to store information. The NV memory 120 may comprise a plurality of NV memory elements 122-1, 122-2, . . . , and 122-N, where "N" may represent a positive integer greater than one. For example, the NV memory 120 may be a flash memory, and the plurality of NV memory elements 122-1, 122-2, . . . , and 122-N may be a plurality of flash memory chips or a plurality of flash memory dies, but the present invention is not limited thereto.

As shown in FIG. 1, the memory controller 110 may comprise a processing circuit such as a microprocessor 112, a storage device such as a read only memory (ROM) 112M, a control logic circuit 114, a buffer memory 116, and a transmission interface circuit 118, where the above components may be coupled to one another via a bus. The RAM 116 is implemented by a random access memory (RAM). In addition, the ROM 112M of this embodiment is arranged to store a program code 112C, and the microprocessor 112 is arranged to execute the program code 112C to control access to the NV memory 120. Note that, in some examples, the program code 112C may be stored in the buffer memory 116 or any type of memory. Further, the control logic circuit 114 may comprise an error correction code (ECC) circuit (not shown) in order to protect data and/or perform error correction, and the transmission interface circuit 118 may conform to a specific communications specification (e.g. the Serial Advanced Technology Attachment (SATA) specification, the Universal Serial Bus (USB) specification, the Peripheral Component Interconnect Express (PCIe) specification, or the NV Memory Express (NVME) specification), and may perform communications according to the specific communications specification. More particularly, the control logic circuit 114 may comprise a queue control circuit 114Q. For example, the queue control circuit 114Q may comprise a plurality of sets of queues respectively corresponding to the NV memory elements 122-1, 122-2, . . . , and 122-N, but the present invention is not limited thereto.

In this embodiment, the host device 50 may transmit a plurality of host commands and corresponding logical addresses to the memory controller 110 to indirectly access the NV memory 120 of the data storage device 100. The memory controller 110 receives the plurality of host commands and the logical addresses, and translates the plurality of host commands into memory operation commands (referred to as operation commands for brevity), and further controls the NV memory 120 through the operation commands to perform reading, writing/programming on memory units or data pages having physical addresses within the NV memory 120, where the physical addresses correspond to the logical addresses. For example, regarding an access operation of any NV memory element 122-$n$ within the plurality of NV memory elements 122-1, 122-2, . . . , and 122-N (where "n" may represent any integer in the interval [1, N]), a corresponding set of queues within the plurality of sets of queues may be arranged to queue the operation commands in order to access the NV memory element 122-$n$.

Figure 2:
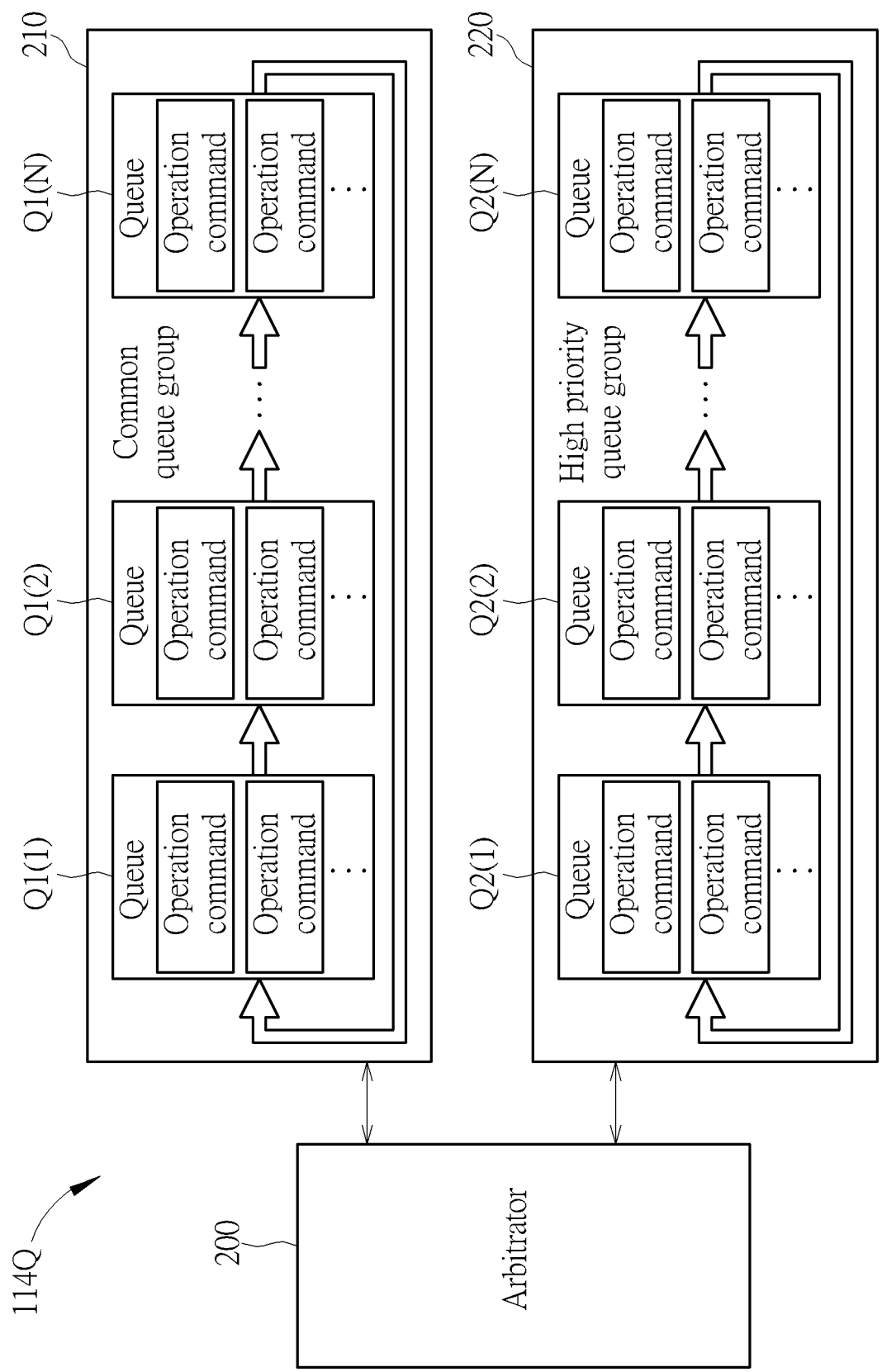
FIG. 2 is a queue control scheme of a method for performing read acceleration according to an embodiment of the present invention.

FIG. 2 is a queue control scheme of a method for performing read acceleration according to an embodiment of the present invention. The queue control circuit 114Q may comprise an arbitrator 200, a common queue group 210 and a high priority queue group 220. More particularly, the common queue group 210 may comprise one or more queues (e.g. N queues, such as queues Q1(1), Q1(2), . . . , and Q1(N)), and the high priority queue group 220 may comprise one or more queues (e.g. N queues, such as queues Q2(1), Q2(2), . . . , and Q2(N)). As shown in FIG. 2, the arbitrator 200 may switch and execute operation commands respectively queued in the queues Q1(1), Q1(2), . . . , and Q1(N) by turns in the common queue group 210, and switch and execute operation commands respectively queued in the queues Q2(1), Q2(2), . . . , and Q2(N) by turns in the high priority queue group 220, where the arbitrator 200 may sequentially switch or provide respective queues with different weightings, and sequentially switch between queues according to the weightings. In addition, N sets of queues {Q1(1), Q2(1)}, {Q1(2), Q2(2)}, . . . , and {Q1(N), Q2(N)} within combination of the common queue group 210 and the high priority queue group 220 may be an example of the aforementioned plurality of sets of queues, where the N sets of queues {Q1(1), Q2(1)}, {Q1(2), Q2(2)}, . . . , and {Q1(N), Q2(N)} correspond to the NV memory elements 122-1, 122-2, . . . , and 122-N, respectively. The arbitrator 200 may control the high priority queue group 220 to have higher priority than the common queue group 210. When any operation command exists in the high priority queue group 220, if needed, the memory controller 110 can suspend operations of the operation commands within the common queue group 210.

According to this embodiment, the plurality of host commands may comprise write command(s) and read command(s). When receiving a host command within the plurality of host commands, the memory controller 110 (e.g. the microprocessor 112 therein) may fill one or more operation commands corresponding to this host command into a certain queue, such as a certain queue (e.g. the queue Q1(n) or Q2(n)) within the set of queues {Q1(n), Q2(n)} corresponding to the NV memory element 122-n, to access (e.g. read or write) data in the NV memory element 122-n. For better comprehension, assume that the memory controller 110 receives a first host command such as a write command from the host device, and receives a second host command such as a read command from the host device 50 while the first host command is being executed, where the first host command is not urgent but the second host command is urgent, and these operations all involve a same NV memory element within the NV memory 120, such as the NV memory element 122-n, but the present invention is not limited thereto.

When receiving the first host command such as the write command, the memory controller 110 (e.g. the microprocessor 112 therein) may fill a first operation command corresponding to the first host command into the queue Q1(n) within the common queue group 210 in order to write data into the NV memory element 122-n. For example, at a first time point, the first operation command may be located at the beginning of the queue Q1(n), and the memory controller 110 may transmit the first operation command to the NV memory element 122-n through the control logic circuit 114 in order to write data into the NV memory element 122-n. In addition, when receiving the second host command such as the read command, the memory controller 110 (e.g. the microprocessor 112 therein) may fill a second operation command corresponding to the second host command into the queue Q2(n) within the high priority queue group 220 in order to read data from the NV memory element 122-n. Since the high priority queue group 220 has higher priority than the common queue group 210, and the set of queues {Q1(n), Q2(n)} respectively belong to the common queue group 210 and the high priority queue group 220, the queue Q2(n) has higher priority than the queue Q1(n). When the second operation command exists in the queue Q2(n), the memory controller 110 may suspend performing the operation of the first operation command within the queue Q1(n). For example, at a second time point (which is later than the first time point), the second operation command is located at the beginning of the queue Q2(n), and the memory controller 110 may transmit the second operation command to the NV memory element 122-n through the control logic circuit 114 in order to read data from the NV memory element 122-n. Assuming that there is no operation command in the queue Q2(n) after this read operation is finished, the memory controller 110 may continue performing the operation of the first operation command within the queue Q1(n).

According to some embodiments, since the memory controller 110 may convert the first host command (such as the write command) and the second host command (such as the read command) into the first operation command and the second operation command, respectively, the first operation command may represent the first host command such as the write command, and the second operation command may represent the second host command such as the read command, but the present invention is not limited thereto.

According to some embodiments, the memory controller 110 receives the write command from the host device 50, and performs programming on the NV memory element 122-n according to the write command, and records the operation command-related information corresponding to the write command, where the operation command-related information may comprise at least one parameter (e.g. one or more parameters, which may relate to the first operation command), and may further comprise at least one physical address (e.g. one or more physical addresses, which may relate to the first operation command) and data, but the present invention is not limited thereto. For example, the operation command-related information may comprise one or more plane numbers, one or more physical block addresses, and/or one or more physical page addresses. In addition, when a command (e.g. the read command) having high priority exists in the queue Q2(n) corresponding to the NV memory element 122-n, the memory controller 110 may suspend performing programming on the NV memory element 122-n and execute the read command; and after executing the read command, the memory controller 110 may continue performing programming on the NV memory element 122-n at least according to the operation command-related information. Since the read command is located in the queue Q2(n) (which has higher priority than the queue Q2(n)), it can be regarded as a command having high priority.

Figure 3:
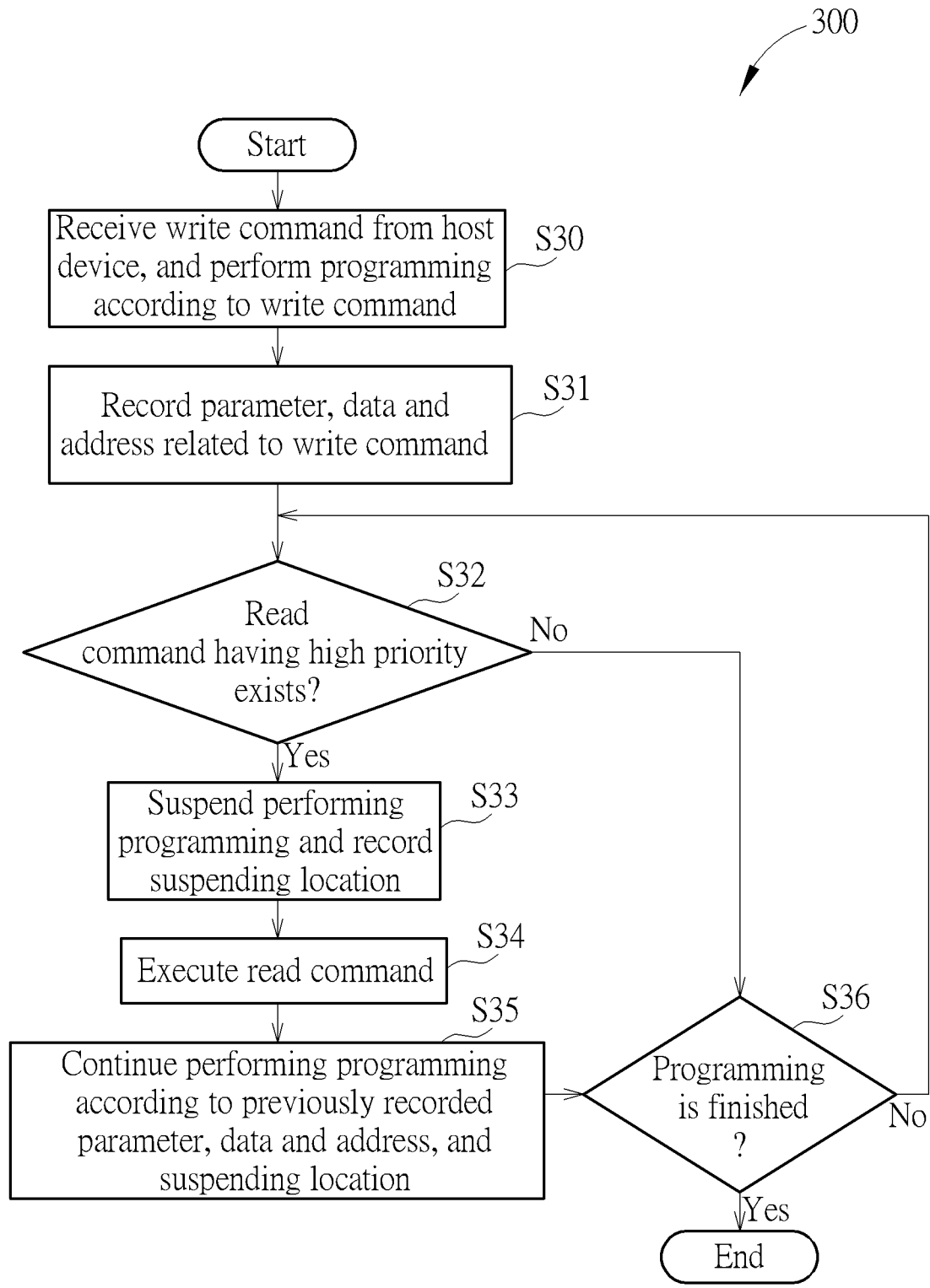
FIG. 3 illustrates a working flow of the method according to an embodiment of the present invention.

FIG. 3 illustrates a working flow 300 of the method according to an embodiment of the present invention. For example, under control of the processing circuit such as the microprocessor 112, the controller such as the memory controller 110 can perform the operations of the working flow 300.

In Step S30, the memory controller 110 may receive a write command (such as the aforementioned write command) from the host device 50, and perform programming according to the write command. For example: the memory controller 110 may convert the write command into a corresponding operation command such as the first operation command, and queue the first operation command into the queue Q1(n); and the memory controller may transmit the first operation command to the NV memory element 122-n in order to perform programming, to write data into the NV memory element 122-n.

In Step S31, the memory controller 110 may record a parameter, data and an address related to the write command. According to this embodiment, the memory controller 110 may transmit the first operation command and the operation command-related information corresponding to the write command (such as the aforementioned at least one parameter, the aforementioned data and the aforementioned at least one physical address) to the NV memory element 122-n in Step S30, to perform programming, and record the operation command-related information in Step S31, but the present invention is not limited thereto. In some embodiments, the memory controller may record the operation command-related information first, and then transmit the first operation command and the operation command-related information to the NV memory element 122-n in order to perform programming.

In Step S32, the memory controller 110 may check whether a read command having high priority (such as the aforementioned read command) exists in the queue Q2(n). When the read command exists in the queue Q2(n), Step S33 is entered; otherwise, Step S36 is entered.

In Step S33, regarding the NV memory element 122-n, the memory controller 110 may suspend performing programming and record a suspending location. For example, the suspending location may represent the location at which the programming operation is suspended in Step S30, such as the last location that has been programmed, but the present invention is not limited thereto. In some embodiments, the suspending location may represent a next location of the last location.

In Step S34, the memory controller 110 may execute the read command. For example: the memory controller 110 may convert the read command into a corresponding operation command such as the second operation command, and queue the second operation command into the queue Q2(n); and the memory controller 110 may transmit the second operation command to the NV memory element 122-n in order to read data from the NV memory element 122-n.

In Step S35, the memory controller 110 may continue performing programming according to the previously recorded parameter, data and address, and the suspending location. According to this embodiment, the memory controller 110 may continue performing programming on the NV memory element at a location after the suspending location (e.g. the next location of the last location), but the present invention is not limited thereto.

In Step S36, the memory controller 110 may check whether the programming is finished. When the programming is finished, the working flow 300 is ended; otherwise, Step S32 is entered.

For better comprehension, the method may be illustrated by the working flow 300 shown in FIG. 3, but the present invention is not limited thereto. According to some embodiments, one or more steps may be added, removed or changed in the working flow 300.

According to some embodiments, the memory controller 110 may transmit the first operation command and the operation command-related information to the NV memory element 122-n in Step S30, to write data into the NV memory element 122-n, and more particularly, based on the following format:

80h-ADDRESS(1)-DATA-00h;

where the hexadecimal values 80h and 00h may represent predetermined commands, ADDRESS(1) may represent a physical address (which may indicate the location in which data is going to be written within the NV memory element 122-n), and DATA may represent the data to be written, but the present invention is not limited thereto. In addition, the memory controller 110 may transmit other operation commands to the NV memory element 122-n in Step S33, to suspend programming, and more particularly, based on the following format:

84h-ADDRESS(1)-00h;

where the hexadecimal value 84h may represent a predetermined command, but the present invention is not limited thereto. Additionally, the memory controller 110 may transmit the second operation command and related information thereof to the NV memory element 122-n in Step S34, to read data from the NV memory element 122-n, and more particularly, based on the following format:

00h-ADDRESS(2)-30h;

where ADDRESS(2) may represent a physical address (which may indicate the location in which data to be read is stored within the NV memory element 122-n), and the hexadecimal value 30h may represent a predetermined command, but the present invention is not limited thereto. For example, a physical address (such as the physical addresses ADDRESS(1) and ADDRESS(2)) may comprise address information of the following format:

{CE #, PLANE #, BLK #, PAGE #, OFFSET};

where CE #, PLANE #, BLK #, PAGE # and OFFSET may represent a flash die number, a plane number, a physical block address, a physical page address and an offset, respectively, and each of them may comprise one or more bits, but the present invention is not limited thereto. In some embodiments, the offset OFFSET exists only when reading data is performed, and can be omitted when data programing is performed, but the present invention is not limited thereto.

Some implementation details regarding queue management and related control in the memory controller 110 are described as follows. According to some embodiments, after converting the second host command such as the read command into the second operation command, the memory controller 110 (e.g. the microprocessor 112) may poll whether the NV memory element 122-n is in a free state. When it is in a busy state, rather than the free state, the memory controller 110 (e.g. the microprocessor 112) may poll whether the NV memory element 122-n is in a programming state. For example, when yes, the memory controller 110 may check a state of a first flag in order to perform further processing; otherwise, the memory controller 110 may fill the second operation command into a buffer queue Q0(n) (not shown). If the first flag has been set (e.g. a logic value "1"), the memory controller 110 may temporarily fill the second operation command into the buffer queue Q0(n) for re-processing when performing the operation of checking whether the NV memory element 122-n is in the free state next time; otherwise (i.e. the first flag is not set, e.g. a logic value "0"), the memory controller 110 (e.g. the microprocessor 112) may fill the second operation command into the queue Q2(n) and set the first flag (set to the logic value "1"). When the NV memory element 112-n is in the free state, the memory controller 110 (e.g. the microprocessor 112) may also fill the second operation command into the queue Q2(n) and set the first flag (set to the logic value "1"). As a result, the memory controller 110 can perform management according to the first flag, and can perform similar operations with regard to operation commands corresponding to any other read commands, but the present invention is not limited thereto. For example, when performing other related operations, the memory controller 110 may refer to the first flag, and may change the first flag (e.g. set to the logic value "1", or cancel to set to the logic value "0") if needed in order to perform corresponding management.

In addition, the memory controller 110 may transmit a predetermined command 70h to the NV memory element 122-n in order to poll the state of the NV memory element 122-n. For example, after suspending programming based on the format "84h-ADDRESS(1)-00h", and before transmitting the second operation command and the related information thereof to the NV memory element 122-n based on the format "00h-ADDRESS(2)-30h", the memory controller 110 may poll the state of the NV memory element 122-n through the predetermined command 70h, to determine whether the NV memory element 122-n is already in a suspending programming state. More particularly, when yes, the memory controller 110 may transmit the second operation command and the related information thereof; otherwise, the memory controller 110 may wait for a short time and repeat this check operation. In another example, after transmitting the second operation command and the related information thereof to the NV memory element 122-n based on the format "00h-ADDRESS(2)-30h", the memory controller 110 may poll the state of the NV memory element 122-*n* through the predetermined command 70h, to determine whether target data (such as the data to be read) within the NV memory element 122-*n* has been moved to an internal buffer (such as a page buffer) of the NV memory 120. More particularly, when yes, the memory controller 110 may read out the target data (e.g. through one or more predetermined commands such as 05h-E0h) in order to temporarily store the target data into the buffer memory 116; otherwise, the memory controller 110 may wait for a short time and repeat this check operation. After reading out the target data, the memory controller may transmit a predetermined command 13h to the NV memory element 122-*n* in order to continue performing programming; for example, the memory controller 110 may further transmit the predetermined command 70h to the NV memory element 122-*n* in order to poll the state of the NV memory element 122-*n*, to determine whether the programming is finished, but the present invention is not limited thereto.

After reading the above embodiments, those skilled in the art should understand implementations of the method of the present invention applied in other related operations and management, and therefore, the corresponding details are omitted for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing read acceleration, applied to a non-volatile (NV)-memory-based data storage device, the NV-memory-based data storage device comprising a NV memory, the NV memory comprising a plurality of NV memory elements, the method comprising:
    receiving a write command from a host device, converting the write command into a first operation command, and performing programming on a NV memory element within the plurality of NV memory elements according to the write command by transmitting the first operation command, as well as a first physical address, to the NV memory element, wherein the first physical address comprises first address information of a predetermined format, and the first address information comprises a NV-memory-element number, a plane number, a physical block address and a physical page address;
    recording operation command-related information corresponding to the write command, wherein the operation command-related information comprises at least one portion of the first physical address;
    in response to a read command having high priority existing in a queue corresponding to the NV memory element, suspending performing the programming on the NV memory element and recording NV-memory-element-programming-suspending location information regarding where performing the programming on the NV memory element is suspended within the NV memory element, for indicating a second physical address that is not equal to the first physical address;
    converting the read command into a second operation command, and executing the read command by transmitting at least the second operation command to the NV memory element; and
    after executing the read command, continuing performing the programming on the NV memory element at least according to the operation command-related information;

wherein in addition to the operation command-related information that is previously recorded, continuing performing the programming on the NV memory element is further based on said NV-memory-element-programming-suspending location information regarding where performing the programming on the NV memory element is suspended within the NV memory element, and based on said NV-memory-element-programming-suspending location information for indicating the second physical address, a memory controller within the NV-memory-based data storage device is arranged to, after executing the read command, immediately continue performing the programming on the NV memory element according to the write command, wherein operations of performing the programming on the NV memory element and continuing performing the programming on the NV memory element are performed according to the write command, and an operation of executing the read command having the high priority is performed in response to the read command which is different from the write command, wherein the second physical address comprises second address information of the predetermined format and among a NV-memory-element number, a plane number, a physical block address and a physical page address of the second address information, at least the NV-memory-element number of the second address information is equal to that of the first address information.

2. The method of claim 1, wherein the operation command-related information comprises at least one parameter.

3. The method of claim 2, wherein the operation command-related information further comprises data to be written into the NV memory element.

4. The method of claim 1, wherein the NV memory is a flash memory, and the NV-memory-element number of any of the first address information and the second address information is a flash die number.

5. A non-volatile (NV)-memory-based data storage device, comprising:
    a NV memory, arranged to store information, wherein the NV memory comprises a plurality of NV memory elements; and
    a controller, coupled to the NV memory, arranged to control operations of the NV-memory-based data storage device, wherein the controller comprises:
        a processing circuit, arranged to control the controller according to a plurality of host commands from a host device, to allow the host device to access the NV memory through the controller, wherein:
            the controller receives a write command from the host device, converts the write command into a first operation command, and performs programming on a NV memory element within the plurality of NV memory elements according to the write command by transmitting the first operation command, as well as a first physical address, to the NV memory element, wherein the write command is a host command within the plurality of host commands, the first physical address comprises first address information of a predetermined format, and the first address information comprises a NV-memory-element number, a plane number, a physical block address and a physical page address;

the controller records operation command-related information corresponding to the write command, wherein the operation command-related information comprises at least one portion of the first physical address;

when a read command having high priority exists in a queue corresponding to the NV memory element, the controller suspends performing the programming on the NV memory element and records NV-memory-element-programming-suspending location information regarding where performing the programming on the NV memory element is suspended within the NV memory element, for indicating a second physical address that is not equal to the first physical address, wherein the read command is another host command within the plurality of host commands;

the controller converts the read command into a second operation command, and executes the read command by transmitting at least the second operation command to the NV memory element; and after executing the read command, the controller continues performing the programming on the NV memory element at least according to the operation command-related information;

wherein in addition to the operation command-related information that is previously recorded, continuing performing the programming on the NV memory element is further based on said NV-memory-element-programming-suspending location information regarding where performing the programming on the NV memory element is suspended within the NV memory element, and based on said NV-memory-element-programming-suspending location information for indicating the second physical address, the controller within the NV-memory-based data storage device is arranged to, after executing the read command, immediately continue performing the programming on the NV memory element according to the write command, wherein operations of performing the programming on the NV memory element and continuing performing the programming on the NV memory element are performed according to the write command, and an operation of executing the read command having the high priority is performed in response to the read command which is different from the write command, wherein the second physical address comprises second address information of the predetermined format and among a NV-memory-element number, a plane number, a physical block address and a physical page address of the second address information, at least the NV-memory-element number of the second address information is equal to that of the first address information.

6. The NV-memory-based data storage device of claim 5, wherein the operation command-related information comprises at least one parameter.

7. The NV-memory-based data storage device of claim 6, wherein the operation command-related information further comprises data to be written into the NV memory element.

8. The NV-memory-based data storage device of claim 5, wherein the NV memory is a flash memory, and the NV-memory-element number of any of the first address information and the second address information is a flash die number.

9. A controller of a non-volatile (NV)-memory-based data storage device, the NV-memory-based data storage device comprising the controller and a NV memory, the NV memory comprising a plurality of NV memory elements, the controller comprising:

a processing circuit, arranged to control the controller according to a plurality of host commands from a host device, to allow the host device to access the NV memory through the controller, wherein:

the controller receives a write command from the host device, converts the write command into a first operation command, and performs programming on a NV memory element within the plurality of NV memory elements according to the write command by transmitting the first operation command, as well as a first physical address, to the NV memory element, wherein the write command is a host command within the plurality of host commands, the first physical address comprises first address information of a predetermined format, and the first address information comprises a NV-memory-element number, a plane number, a physical block address and a physical page address;

the controller records operation command-related information corresponding to the write command, wherein the operation command-related information comprises at least one portion of the first physical address;

when a read command having high priority exists in a queue corresponding to the NV memory element, the controller suspends performing the programming on the NV memory element and records NV-memory-element-programming-suspending location information regarding where performing the programming on the NV memory element is suspended within the NV memory element, for indicating a second physical address that is not equal to the first physical address, wherein the read command is another host command within the plurality of host commands;

the controller converts the read command into a second operation command, and executes the read command by transmitting at least the second operation command to the NV memory element; and after executing the read command, the controller continues performing the programming on the NV memory element at least according to the operation command-related information;

wherein in addition to the operation command-related information that is previously recorded, continuing performing the programming on the NV memory element is further based on said NV-memory-element-programming-suspending location information regarding where performing the programming on the NV memory element is suspended within the NV memory element, and based on said NV-memory-element-programming-suspending location information for indicating the second physical address, the controller within the NV-memory-based data storage device is arranged to, after executing the read command, immediately continue performing the programming on the NV memory element according to the write command, wherein operations of performing the programming on the NV memory element and continuing performing the programming on the NV memory element are performed according to the write command, and an operation of executing the read command having the high priority is performed in response to the read command which is different from the write command, wherein the second physical address comprises second address information of the predetermined format and among a NV-memory-element number, a plane number, a physical block address and a physical page address of the second address information, at least the NV-memory-element number of the second address information is equal to that of the first address information.

10. The controller of claim 9, wherein the operation command-related information comprises at least one parameter.

11. The controller of claim 10, wherein the operation command-related information further comprises data to be written into the NV memory element.

12. The controller of claim 9, wherein the NV memory is a flash memory, and the NV-memory-element number of any of the first address information and the second address information is a flash die number.

\* \* \* \* \*